US007075481B2

(12) United States Patent
Huston et al.

(10) Patent No.: US 7,075,481 B2
(45) Date of Patent: Jul. 11, 2006

(54) SYSTEM AND METHOD FOR DETERMINING FREIGHT CONTAINER LOCATIONS

(76) Inventors: Charles Huston, 2103 Hartford, Austin, TX (US) 78703; Daryl Cornish, 8017 Davis Mountain Pass, Austin, TX (US) 78726

( * ) Notice: Subject to any disclaimer, the term of this patent is extended or adjusted under 35 U.S.C. 154(b) by 526 days.

(21) Appl. No.: 09/859,294

(22) Filed: May 16, 2001

(65) Prior Publication Data

US 2002/0070891 A1 Jun. 13, 2002

Related U.S. Application Data

(63) Continuation-in-part of application No. 07/804,368, filed on Dec. 10, 1991, now Pat. No. 5,364,093, and a continuation of application No. 08/334,733, filed on Nov. 4, 1994, now Pat. No. 6,266,008.

(51) Int. Cl.
*G01S 5/02* (2006.01)
*H04B 7/185* (2006.01)

(52) U.S. Cl. .............................. 342/357.14; 342/357.1; 342/357.09; 701/215

(58) Field of Classification Search ............ 342/357.14, 342/357.1, 357.09, 357.17; 701/215
See application file for complete search history.

(56) References Cited

U.S. PATENT DOCUMENTS

| | | | |
|---|---|---|---|
| 3,771,483 A | 11/1973 | Bond | |
| 4,656,463 A * | 4/1987 | Anders et al. | 340/572 |
| 4,656,476 A | 4/1987 | Tavtigian | |
| 4,703,444 A | 10/1987 | Storms, Jr. et al. | |
| 4,896,580 A | 1/1990 | Rudnicki | 89/1.815 |
| 4,910,677 A | 3/1990 | Remedio et al. | |
| 5,056,106 A | 10/1991 | Wang et al. | |
| 5,086,390 A | 2/1992 | Matthews | |
| 5,129,605 A | 7/1992 | Burns et al. | 246/5 |
| 5,148,002 A | 9/1992 | Kuo et al. | |
| 5,223,844 A | 6/1993 | Mansell et al. | 342/357 |
| 5,440,491 A * | 8/1995 | Kawano et al. | |
| 5,491,486 A | 2/1996 | Welles, II et al. | 342/357 |
| 5,512,902 A | 4/1996 | Guthrie et al. | 342/357 |
| 5,519,403 A | 5/1996 | Bickley et al. | 342/352 |
| 5,539,810 A * | 7/1996 | Kennedy, III et al. | 379/59 |
| 5,550,551 A | 8/1996 | Alesio | 342/457 |
| 5,956,250 A * | 9/1999 | Gudat et al. | |

FOREIGN PATENT DOCUMENTS

WO 87/06713 11/1987

OTHER PUBLICATIONS

Klein, D. and Parkinson, B., "The Use of Pseudo–Satellites for Improving GPS Performance" (Jun. 1984).

* cited by examiner

*Primary Examiner*—Theodore M. Blum
(74) *Attorney, Agent, or Firm*—Charles D. Huston; Daffer McDaniel, LLP

(57) ABSTRACT

A system and method for determining the locations of freight containers in a freight yard is described. A remote unit that includes a GPS receiver is attached to the freight containers. The remote receivers have an independent power supply—a battery. Intermittently, either by a timer or by a motion detector, the remote receivers are operated. During operation, the remote receivers receive signals from the global positioning satellite system and at an allotted time, transmit the GPS data to a base station before shutting down to conserve power. The base station processes the GPS data to determine a position in the freight yard of each freight container. When a particular freight container or contents is desired, a data base in the base station can be consulted and the contents and location of a particular freight container located. The freight yard is typically outside with a view of the GPS constellation, such as a rail yard, airport baggage area, ship yard, truck park, etc. An alternative is described for use where the freight yard is a warehouse and the satellite view is obstructed. The alternative uses psuedolites or repeaters to track freight containers within the warehouse.

15 Claims, 7 Drawing Sheets

Packet Radio
Network

Remote Unit Alternative Embodiment

SYSTEM AND METHOD FOR DETERMINING FREIGHT CONTAINER LOCATIONS The present invention is a continuation-in-part of U.S. patent application Ser. No. 07/804,368 filed Dec. 10, 1991, now U.S. Pat. No. 5,364,093 entitled "Golf Distance Measuring System and Method" and a continuation of Ser. No. 08/334,733 filed Nov. 4, 1994, now U.S. Pat. No. 6,266,008 entitled "System and Method for Determining Freight Container Locations."

BACKGROUND OF THE INVENTION

1. Field of the Invention

This invention relates to a system and method for tracking inventory and freight using the global positioning satellite system.

2. Description of the Related Art

The present invention utilizes the global positioning satellite system (GPS) to determine the location of freight, inventory, packages or the like ("freight") in a holding area, such as a freight terminal, railyard, airport, warehouse or other storage area. Knowledge of GPS and freight or inventory problems and procedures is useful for an appreciation of the present invention. U.S. patent application Ser. No. 07/804,368 entitled "Golf Distance Measuring System and Method" (incorporated by reference) describes inter alia a system for tracking golf carts and players on a golf course using GPS and is analogous to the present invention which tracks freight.

THE GLOBAL POSITIONING SATELLITE SYSTEM

GPS is a spaced based system of satellites which can provide an infinite number of receivers accurate three dimensional position (i.e. horizontal location and altitude), velocity, and time. A general understanding of GPS is useful to appreciate the operation of the present invention. Numerous books and articles are available on GPS operation and theory. See e.g., GPS—A Guide to the Next Utility, Trimble Navigation (incorporated by reference for background).

The GPS system is an umbrella of satellites circling the earth passively transmitting signals. Each satellite has a very accurate atomic clock which is periodically updated. A GPS receiver with an accurate clock can identify a satellite and determine the transit time of the signal from the satellite to the receiver. Knowing the transit time and knowing that the speed of light is 186,000 miles per second enables a calculation of the distance from the satellite to the receiver. The signal carries with it data which discloses satellite position and time of transmission, and synchronizes the GPS receiver with the satellite clocks.

As a GPS receiver locates 3 or 4 satellites it determines its distance from each satellite. The intersection of these 3 or 4 spheres enables a precise location of the receiver (and some compensation for timing errors in the receiver's internal clock). The GPS system should have 21 satellites and 3 spares once the system is fully deployed. The full constellation of 24 ellites was declared operational in 1994.

There are basically two types of GPS receivers—P (precision) code and C/A (coarse availability) code. P code is for government use only and requires specialized equipment. C/A code receivers are becoming widely available with the continuing deployment of GPS satellites. One difficulty with C/A code receivers is that the government from time to time intentionally degrades the satellite signals—so called "selective availability." With selective availability turned on horizontal accuracy is on the order of 50–100 meters. With selective availability disabled horizontal accuracy can improve to around 15 meters, often better than 5 meters.

There are several methods presently available for improving the horizontal accuracy of GPS. One method is called "differential" and generally involves sending a correction signal from a base station located at a known coordinate. For example, the U.S. Coast Guard has placed a number of GPS base stations at known locations around the U.S. coast region. These base stations compare their GPS computed positions with the known coordinates of their location to calculate a differential correction. This differential correction is then broadcast to any GPS receiver in range. This correction may be a position correction, but normally the correction is to the timing signal for each individual satellite so that GPS receivers looking at different satellites may calculate their own correction. This is a "wide area" approach. A "local area" approach is also often used for differential correction where a private gps base station is positioned at a known location and broadcasts a private or local correction.

Another correction approach which has not yet matured but is promising is a so-called "pseudolite" correction. With a pseudolite a GPS transmitter transmits a timing signal much like a GPS satellite. See, The Use of Pseudo-Satellites For Improving GPS Performance, D. Klein, B. Parkinson, Navigation (1984), reprinted Vol. III GPS Navigation p. 135 (1986); Optimal locations of Pseudolites for Differential GPS, B. Parkinson, K. Fitzgibbon, 30 Navigation J. No.4, winter 1986–87 (incorporated by reference for background). The pseudolite transmits from a known location on or near the standard GPS carrier frequency (e.g. L1 or L2) to appear to the GPS receiver like another gps satellite. The difference is the pseudolite does not have normal gps errors (or at least minimal), such as ephemeris, ionospheric, multipath, etc., and more importantly, the pseudolite does not have the intentional degradation, selective availability. Additionally, a differential correction signal can be added to the pseudolite signal if desired. A primary benefit of use of pseudolites is that unlike normal differential correction, pseudolites do not require a separate communications channel. That is, the pseudolites appear as another satellite channel to the receiver. Another benefit is that the timing data from the pseudolite channel is known to be much more precise.

FREIGHT TRACKING SYSTEMS

Consider a railyard, airport, or sea terminal. A number of railcars or freight containers are constantly on the move into and out of the terminal. The cargo is generally of high value and often transit time is time critical. Indeed, transit time can be very costly when considering a large number of freight containers delayed by even a day extra. The incidence of misdirected or misplaced freight or cargo can add significantly to the shipping costs. Keeping track of where a particular freight container is located is a daunting task considering the often dynamic nature of a freight terminal and repositioning of the cargo.

Tracking inventory in an industrial yard is a similar problem. In manufacturing, it is desirable to track the location and availability of finished goods. Most systems use some form of manual label tracking or bar codes to track the inventory. Unfortunately, manual tracking often requires a person to traverse the inventory and scan labels to identify the presence of the inventory.

SUMMARY OF THE INVENTION

The problems with finding freight in a freight yard are largely solved by the system and method of the present invention. The system tracks individual freight containers by intermittently transmitting the position of a freight container to a base station. The base station is able to post process the GPS data to achieve an accurate location of an individual package—within one meter or better accuracy. The base station preferably has an inventory of the contents of a container. Therefore, when a particular container must be located for reshipment or delivery, the base station need only consult its database to find a particular container's location and contents. This is particularly important when the containers are moving about a freight yard as containers are relocated.

Broadly speaking, the system includes a number of remote GPS receivers attachable to freight containers in a freight yard. The remote receivers are configured to intermittently transmit their location data to a base station. A communication network connects the remote receivers to the base station. The base station is configured to receive and display the location of a particular remote receiver attached to a freight container upon request. "Intermittent" means noncontinuous operation in the context of present invention. Continuous operation is usually unnecessary and adds battery bulk to a remote receiver where minimal size and weight is important. In one form, a timer sets the time for a remote receiver to transmit. In another form, a motion detector initiates a remote receiver operation.

In one form, the remote receivers are simply transmitters for receiving the GPS timing signals, amplifying the signals, and retransmitting the GPS timing signals to the base station. The base station then calculates the location of the remote receiver. In another form, the remote receiver includes a GPS engine which calculates an apparent position based on the GPS timing signals. The base station then applies a differential correction to obtain a more accurate position of the remote receivers.

The method for determining the locations of freight containers in a freight yard in accordance with the present invention includes attaching a number of GPS receivers to freight containers; intermittently operating the receivers to receive GPS signals, and intermittently transmitting data indicative of container location an identification to a base station. The base station receives and records position data of the receivers, and inferentially, the containers the receivers are attached to. Preferably, the base station receives the position data and refines the data by applying a differential correction to obtain an accurate position of the freight containers. Preferably, an inventory of the freight container contents are maintained at the base station so that the location and contents of the container are known.

In another form, the present invention contemplates a system for determining freight containers locations in a warehouse building. GPS signals are generally not available inside of structures because of their low power. the system uses two or more pseudolites positioned within the building for transmitting GPS type of signals. a plurality of remote receivers are attachable to freight containers within the building for intermittently receiving GPS type signals from the pseudolites. Each remote receiver intermittently transmits its GPS type data to a base station over a communication network. The base station receives the positioning data from the remote receivers and displays the location of the remote receivers in the building.

DESCRIPTION OF THE PREFERRED EMBODIMENTS

The present invention is best illustrated by describing several embodiments which are believed preferable depending on the particular freight container location environment. Typically, a remote unit 10 is attached to a freight container and intermittently operates to determine its position and transmit its position to a base station 12. Some applications need only infrequent position updates or reporting, but must be useful for a long period of time, e.g. months. Other applications need frequent position reporting over a short, several week period.

First Embodiment

Turning to the drawings, the system of the present invention includes a remote unit 10, base station 12, and calibration system 40. A remote unit 10 is attached to a freight container in a freight yard and intermittently reports its position to the base station 12, at least while the container remains in the freight yard.

Figure 3:
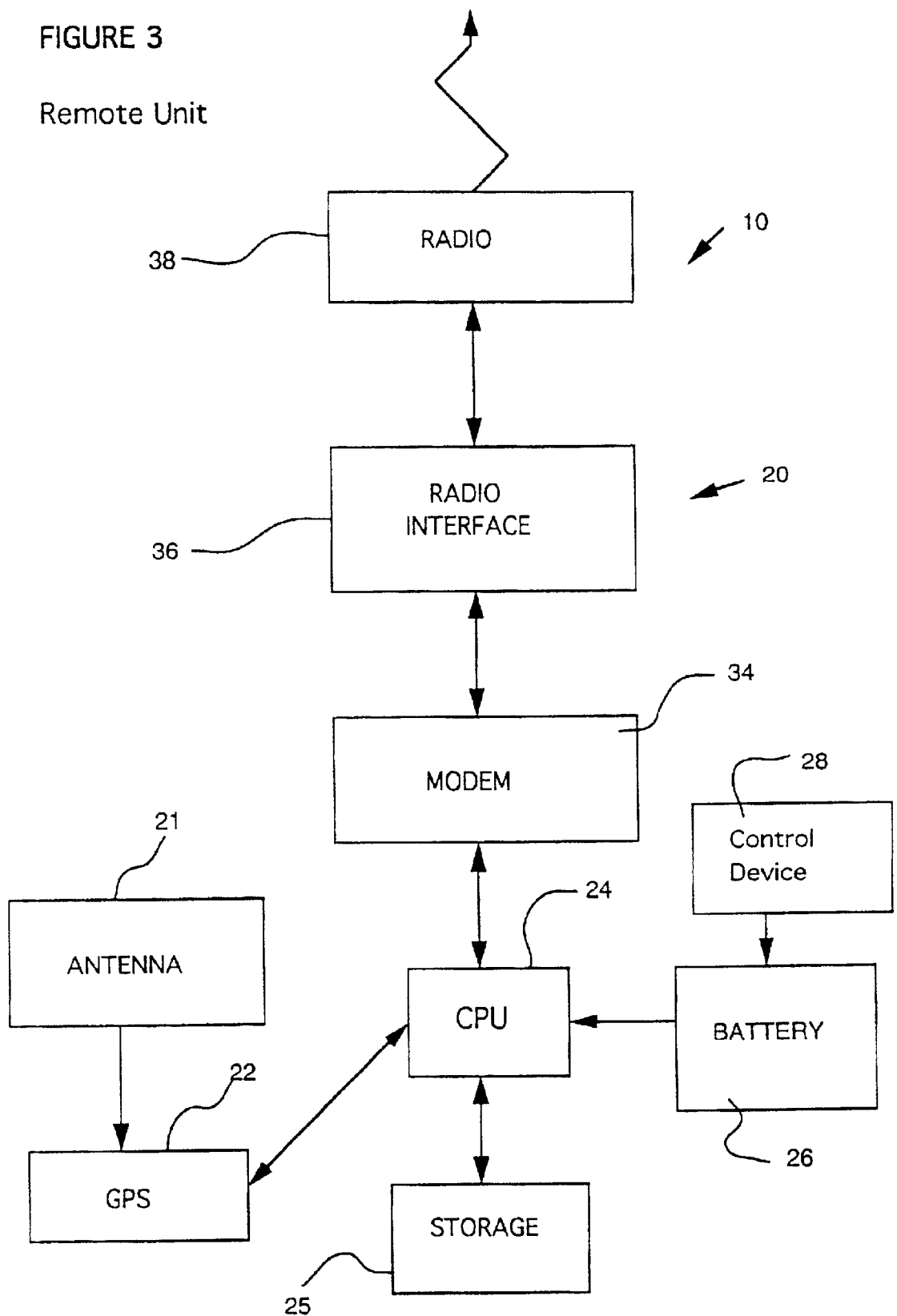
FIG. 3 is a block diagram of a remote unit in accordance with the present invention attached to an aircraft.

As shown in FIG. 3, the remote unit 10 include a packet radio system 20, a GPS antenna 21 and receiver 22, a CPU 24, storage 25, battery 26 and a control device 28. The GPS receiver 22 is preferably the multi-channel receiver such as the SV-6 Model or core module II made by Trimble Navigation of Sunnyvale, Calif. Other commercially available substitutes are acceptable such as made by Magellan or Rockwell/Collins. The antenna 21 is either remote or internal to the receiver 22, but in any event is mounted on the housing of the remote unit 10 for an upward look angle for optimum GPS signal reception. That is, the remote unit 10 is designed for mounting on the top or sides of a freight container for GPS signal reception.

In more detail, the remote unit 10 includes a CPU 24, nonvolatile memory storage 25 and control device 28. Preferably, the control device 28 is simply an activation switch which supplies power to the remote unit 10 to enable operation. In the preferred remote unit, the CPU 24, memory storage 25 (e.g. RAM), and GPS engine 22 are integral, and preferably low power. Of course integration or segregation of the components of FIG. 3 is a simple matter of design choice. CPU 24 includes an internal clock, as is conventional, which is used to initiate operation. That is, the internal clock is low powered and at a preset time initiates operation of the remote unit 10.

In FIG. 3, the packet radio system 20 is conventional, and includes modem 34, radio interface 36, and radio 38 (including an antenna, not shown). The radio system 20 is bi-directional in that it may receive signals and also transmit present position and messages back to the base station 12. A PAC-COM, Inc. (Orlando, Fla.) packet radio modem 300 baud is believed preferable for the modem 34. The ability to receive signals may be useful in certain applications where it is desired to locate a particular container and an indicator, e.g. light or tone, can be initiated to aid location.

In practice the radio system 20 of FIG. 3 may be unidirectional for simply transmitting its apparent location of the remote receiver 10 to the base station 12. An integrated chip set which combines most of the components of the radio system 20 on a single, low cost, low power chip is believed preferable.

Figure 4:
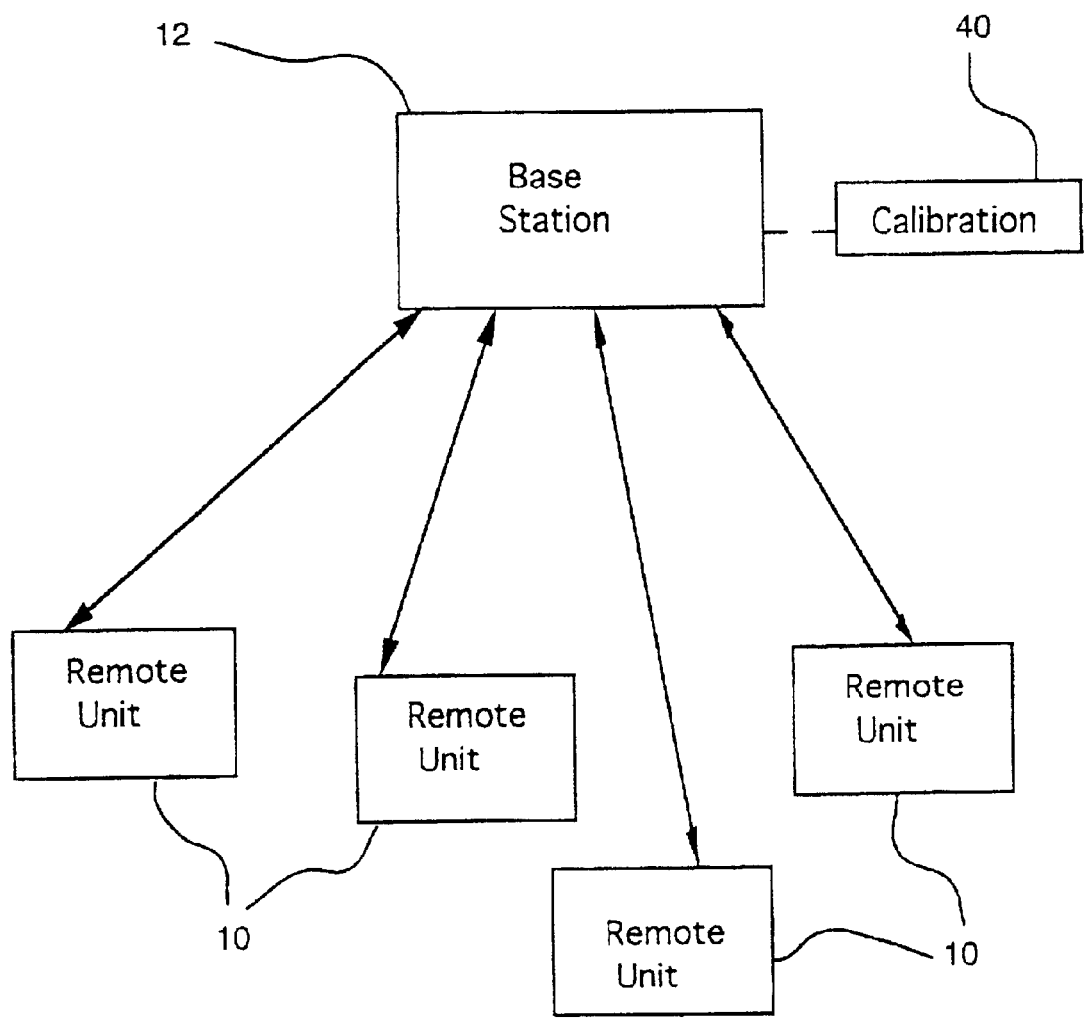
FIG. 4 is a schematic of the packet radio network used to transmit position.

The remote units 10 communicate to the base station 12 over a packet radio network as shown in FIG. 4. The packet radio system is designed to eliminate protocols and acknowledgments to reduce the communications overhead. That is, each remote unit 10 is assigned a time (or event) to operate and transmit its information.

Figure 5:
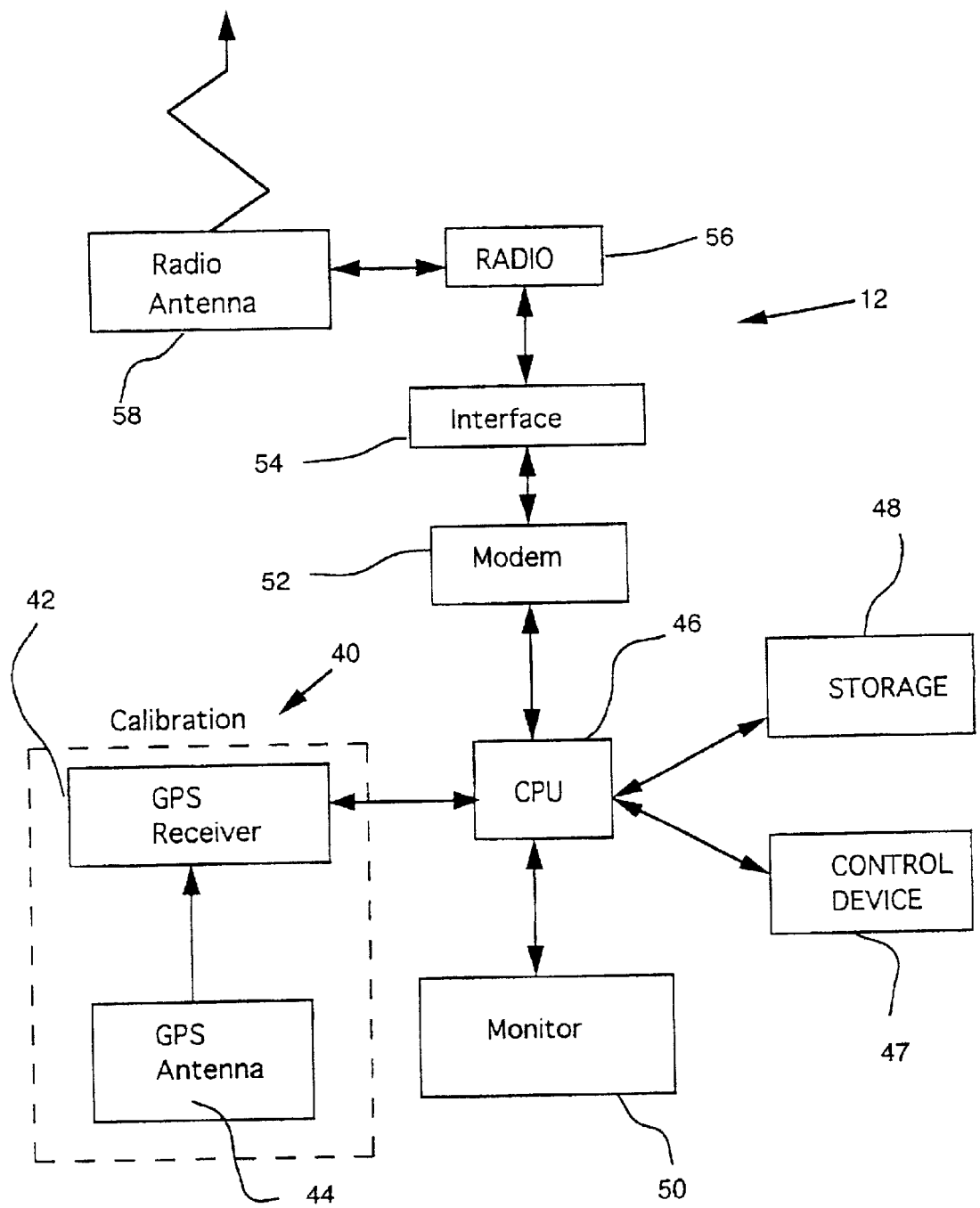
FIG. 5 is a block diagram of the base station in accordance with the present invention.

FIG. 5 illustrates the base station 12, which is desirably placed in a routing office or terminal. The base station 12 includes a calibration section 40 which comprises a GPS receiver 42 and antenna 44. The calibration section 40 continuously determines apparent position of the antenna 44 and feeds this information to CPU 46. The CPU is conventional, such as a 486 type personal computer operating a 66 MHz. The control device 47 preferably includes a mouse and a standard keyboard. The antenna 44 is probably placed a short distance from the location of the CPU and monitor 46,50, but may be displaced a large distance depending on the physical constraints of the freight yard.

A database in storage 48 is connected to the CPU 46 and stores information such as freight yard layout, container inventory, and the present position of the remote units, or at least the last reported position. A monitor 50 is coupled to CPU 46 and is useful not only for initialization, but also is selectable to display the present position of all the remote receiver units 10 in the freight yard. The base station 12 includes a packet radio system similar to FIG. 3 coupled to the CPU 46, and comprises modem 52, interface 54, radio 56 and radio antenna 58.

Figure 1:
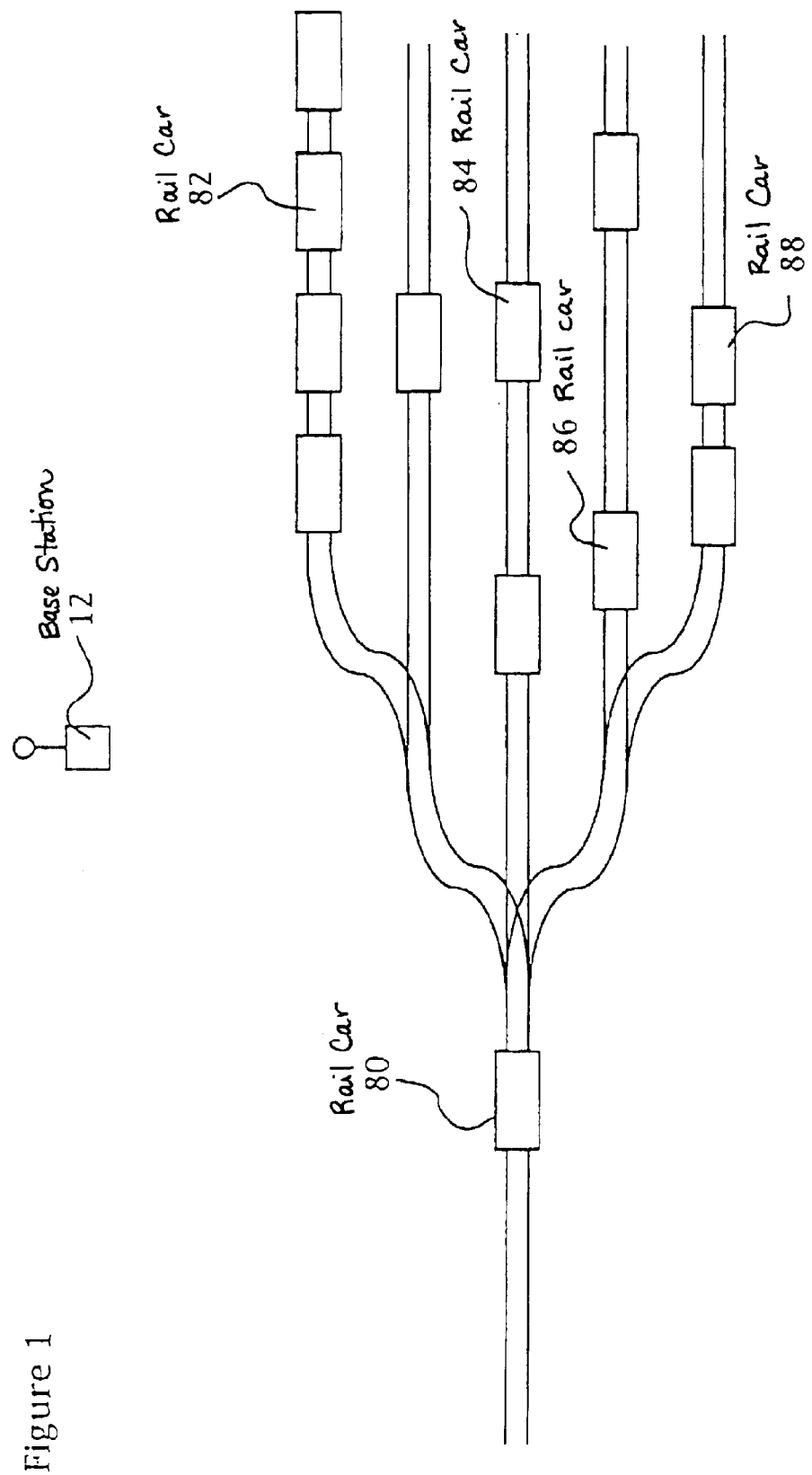
FIG. 1 is a rail yard utilizing the present invention.
Figure 2:
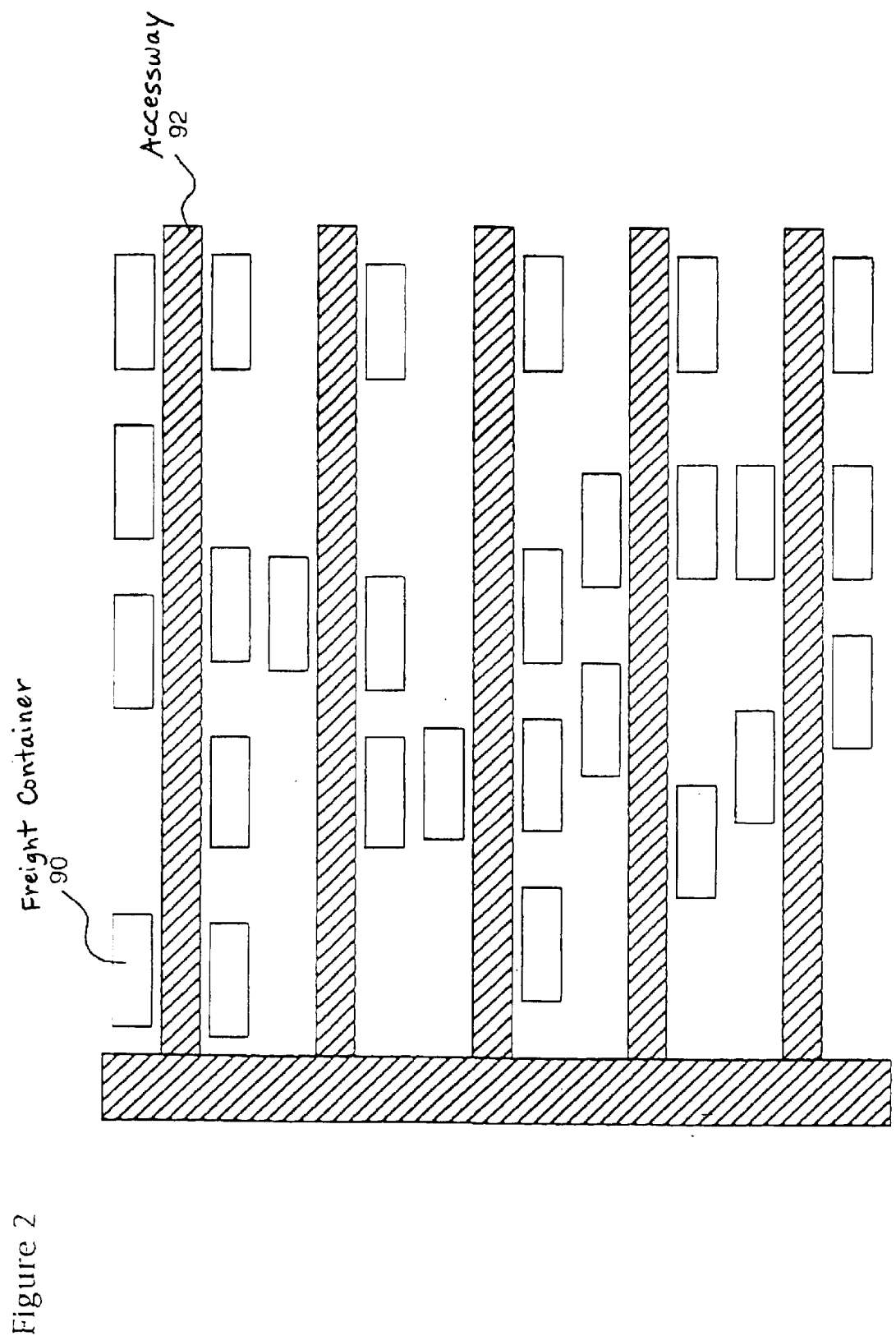
FIG. 2 is a freight staging area utilizing the present invention.

The monitor 50 is capable of displaying the freight yard as shown in FIGS. 1 and 2. The remote units (freight containers) 10 are shown on the physical layout of the freight yard. A special symbol may be used (e.g. flashing container) for a container that is to be located. In the present application the term "freight yard" is used to denote any area for marshaling or holding the freight containers. FIG. 1 depicts the freight yard as a rail terminal switching yard while FIG. 2 illustrates a freight yard where shipboard containers are marshaled in a sea port. Other freight yards, such as a trucking trailer marshaling area or an airport container holding area are of course equally applicable.

Different signal processing techniques may be employed at the base station 12 as desired, such as filtering and compressing. The base station 12 collects each position from the remote units 10 and processes the apparent position to determine a more accurate location of the remote unit. The base station 12 can employ the amount of processing desired to improve the accuracy estimation of the location of the remote unit—commensurate with the time available, the processing load, accuracy desired, etc.

Second Embodiment

Figure 6:
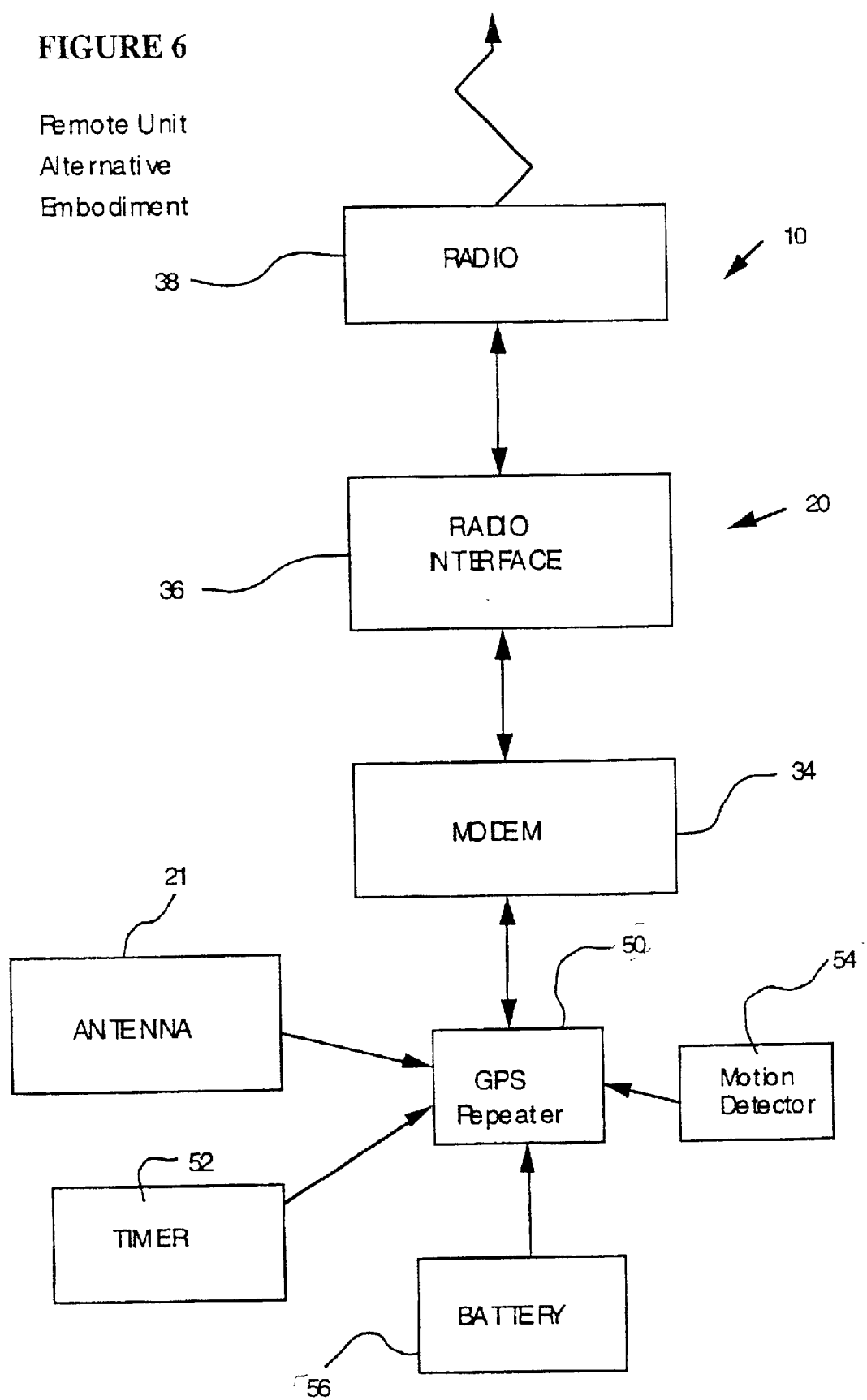
FIG. 6 is a block diagram of another embodiment of a remote unit including a radio link in accordance with the present invention.

The embodiment illustrated in FIG. 6 is useful to illustrate several alternatives that may be incorporated into the first embodiment illustrated in FIG. 3. The GPS "engine" is eliminated in the remote units 10. Rather, each remote unit 10 comprises a GPS repeater, such as a Tidget GPS sensor made by Navsys Corp. of Edinburgh, Scotland. The repeater 50 operates to receive the GPS raw data timing signals from the GPS satellites, digitize and compress the timing signals. Preferably, the repeater 50 can be set to look at a certain number of satellites, e.g. 5 satellites. The satellite timing signals are not processed. Instead, the signals are amplified and periodically relayed to the base station 12 via the radio interface 20.

In FIG. 6, the remote unit 10 includes a separate timer 62 and motion detector 54 for initiating operation. That is, the timer 52 can be set to initiate operation of the remote unit 10 at preset times. Additionally, or alternatively, the motion detector 54 can initiate operation when motion is detected—i.e. movement of the freight container to which the remote unit 10 is attached. Although a low-cost mercury switch is used as the motion detector 54, many other types of motion detectors may be used. The battery 56 is sized depending on the load imposed. A rechargeable 6 volt D-cell nickel cadmium rechargeable battery works for most applications.

The repeater system of FIG. 6 uses GPS time to allocate a transmit window to each remote unit, thus avoiding the handshake protocol communications overhead associated with conventional communications schemes. Each repeater 50 has a unique identification which is transmitted along with position data. Each repeater 50 is allocated, for example, a 5 second transmit time window to transmit its data. Because the base station 12 and all of the repeaters 50 have accurate GPS time data, such a time window allocation is possible. The timer 52 initiates operation of the remote unit, and during operation, the timer is reset to GPS time to ensure accurate time in the timer 52. A repeater 50 receives timing signals from 4 satellites and stores the signals in a temporary memory buffer (compressing if desired) for transmission in its allocated time window. These raw data timing signals include an identification of the satellite.

Different signal processing techniques may be employed if desired to obtain an accurate position estimate of these raw data timing signals, such as filtering and compressing. The base station collects each timing signal from the repeaters 50 and processes the timing signals to determine a location of the repeater. The base station 12 can employ the amount of processing desired to the timing signals to improve the accuracy estimation of the repeater—commensurate with the time available, the processing load, accuracy desired, etc.

The base station 12 receives the timing signals from a certain repeater 50 in the repeater's allocated timing window. The base station has already coprocessed a timing correction (from calibration section 40) for each satellite timing signal, and therefore can apply the correction upon receipt of the repeater timing signal. The repeaters 50 are receiving the timing signals from predominantly the same satellites, so the base station needs to only keep a current correction for the limited number of satellites in view. Using the corrected timing signals, the base station can accurately process the repeater timing signals to derive a location of the repeater in the freight yard.

This embodiment contemplates the use of time windows to avoid the communication overhead associated with hand shake protocols. With this method, it is believed that repeaters on over one thousand freight containers may transmit their timing signals on a single frequency on a daily basis without interference.

Third Embodiment

Figure 7:
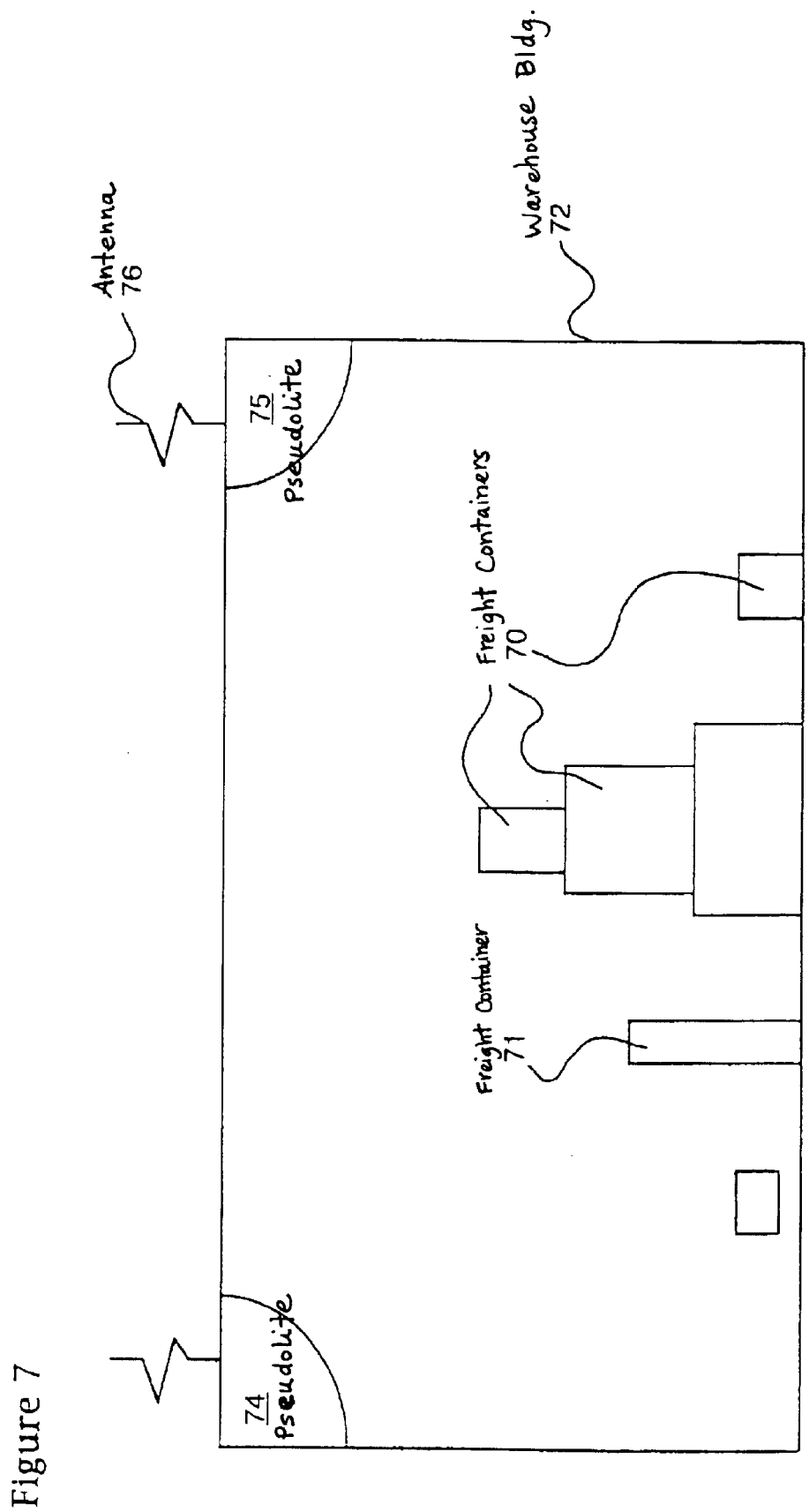
FIG. 7 is a block diagram depicting a warehouse freight system according to the present invention.

FIG. 7 illustrates a number of freight containers 70 inside of a warehouse building 72. Remote units 10 in accordance with the first or second embodiments, FIGS. 3 and 6, are attached to the freight containers 70. Because the freight containers are inside of a building 72, reception of GPS signals from the satellite constellation is not normally possible. Therefore, pseudolites 74,75 are employed within the building 72 and operate like conventional GPS satellites.

Each pseudolite includes an antenna 76 to receive GPS time from the GPS satellites. This eliminates the necessity for an atomic clock in the pseudolites 74 (with a concomitant reduction in cost).

While two pseudolites 74,75 are sufficient to give accurate 3D position to the remote receivers 10, the system of FIG. 7 preferably uses three pseudolites. The elevation of the warehouse floor is known and freight containers may be positioned on the floor which simplifies position calculations. However, because of the closeness of the pseudolites 74,75 to the remote receivers 10, three pseudolites add precision to the location determination. The pseudolites 74 have few of the errors associated with the GPS satellites, e.g. selective availability, ephemeris, ionospheric, multipath, geometry, etc.

Fourth Embodiment

As an alternative to conventional pseudolites, the pseudolites 74,75 in FIG. 7 may be replaced with relays 74,75 to rebroadcast GPS timing signals from the GPS constellation. Consider a GPS satellite S1 and a specific freight container 71 in the warehouse 72. The total time for the GPS signal to reach container 71 is the time t1 from the satellite S1 to relay 74 plus the time t2 from relay 74 to the container 71 plus the rebroadcast delay d. The rebroadcast delay can be made very accurate by updating a clock in the relay 74 with the accurate GPS time from the satellite.

$$T\text{total}=(t1+t2+d)$$

The method for determining the position of the container 71 from the relay 74 can take several forms. In one form, the total time is used from satellite S1 to container 71 minus the delay d to determine a distance from the satellite S1 to container 71. This ignores the angular relationship between container 71 and relay 74. With the distance from container 71 to satellite S1 deduced, the distance between container 71 and another satellite S2 can be deduced in similar fashion and so on. It is not necessary to determine distances to multiple satellites, but in many case the distance from container 71 to relay 74 can be made more accurate. A similar method using relay 75 can be used to determine the signal transit time between container 71 and relay 75, and hence the distance. Using conventional GPS algorithms, a suspected position of container 71 can be determined using 2 or more relays to determine the position of container 71.

In another form, the time t2 from relay 74 to container 71 is determined. The delay d is known and time t1 from the satellite S1 to relay 74 can be determined. That is, the almanac gives the position of the satellite S1 and the precise position of relay 74 can be determined ahead of time which means time t1 can be accurately computed. A measured time at the container 71 is Time total and the delay and t1 times are subtracted to give t2, the signal transit time from relay 74 to container 71. Knowing time t2 determines a distance between relay 74 and container 71. To determine the position of the container 71 in the warehouse 72 another distance is determined. The same procedure can be used to determine a distance between relay 75 and the container 71. That is, knowing the precise location of relay 75 and the rebroadcast delay d enable determination of the time and distance between the relay 75 and the container 71.

It is important that the rebroadcast delays d associated with each relay 74,75 be either known or constant. Additionally, it is usually important for the remote receiver 10 on container 71 to be able to identify which relay 74,75 is being used to rebroadcast the GPS satellite signals. One method has relays 74,75 append an identification message onto the rebroadcast GPS signal. However, it is believed to be preferable to time delimit the rebroadcasts. That is, relay 74 is allocated a time window, e.g. every even second to rebroadcast and relay 75 is allocated another time window to rebroadcast, e.g. every odd second.

It should be understood that the remote unit 10 on the container 71 preferably does not perform these calculations. That is, the remote unit 10 is configured as in FIGS. 3 or 6 (first or second embodiments) and the data is transmitted to the base station 12 for determination of the position of the freight container 71. The base station receives the transmitted data with a time stamp and can determine that the data was rebroadcast through a particular relay by comparing the time stamp with the time windows allotted to the relays.

It should also be understood that this embodiment is illustrated for overcoming the obstruction of a building to receiving GPS signals inside. However, the same technique can be used to eliminate other obstructions to GPS signals. For example, in FIG. 2 the freight containers 90 may be stacked vertically and horizontally spaced close so that GPS signals to the remote receiver units 10 are partially or totally blocked. In this case, one or more relays can be positioned to augment or supplant the normal transmission path of the GPS signals to the remote units 10. For example, a relay may be positioned at the end of each accessway 92 in FIG. 2.

Operation

In FIG. 1, a number of railroad cars (i.e. freight containers) are marshalled in a rail yard (i.e. freight yard). As trains are assembled and disassembled, the railroad cars are constantly moved about the rail yard. to assemble the next train, it is important to know where a particular rail car with a particular inventory is located for inclusion in the next train. There is also an optimal movement of rail cars that will minimize the time and effort to assemble the next train. For example, if it is desired to configure the next train with cars 80–88, knowing the contents and locations of the rail cars 80–88 can minimize the effort (and cost) in assembling the next train.

For illustrative purposes, assume the remote receivers 10 of FIG. 3 are attached to the cars 80–88. Every 8 hours, the CPU 24 initiates operation of the remote unit 10. The GPS 22 powers up and begins determining its apparent location. After a nominal power up cycle, e.g. 3 minutes, the remote unit 10 transmits its apparent location and identification through radio system 20 to base station 12. The base station 12 of FIGS. 1,4, and 5 receives the apparent position from a remote receiver and applies a calibration or differential correction from calibration section 40 to the apparent position to realize an accurate position of the rail cars within a meter or two. It should be appreciated that the apparent position may be sufficiently accurate for the rail car application of FIG. 1.

Knowing the location and identification of a remote unit 10 on a rail car 80–88, the base station consults the database in storage 48 to determine rail car contents. When a particular car or contents is desired, the database tells the user the location of the rail car in the rail yard.

Turning to FIGS. 2 and 6, another illustration of the operation of the present invention is illustrated. In FIG. 2, the freight yard has a number of freight containers 90 positioned along accessways 92. A number of the freight containers 90 have remote receivers 10 configured as depicted in FIG. 6 attached. The remote unit 10 is attached to a freight container 90 when it enters the freight yard. The remote unit 10 is configured to operate once a week unless it is moved. That is, the timer 52 is programmed to initiate operation of the remote unit 10 once every 7 days. Alternatively, motion detector 54 will initiate operation of the remote unit 10 whenever it senses movement.

When operation is initiated, the repeater 50 simply begins to amplify an transmit the GPS timing signals it receives. Therefore, the repeater 50 transmits an identification and a number of GPS timing signals. Each timing signal includes a satellite identification. The base station 12 receives the GPS timing signals (FIG. 5) and determines a location for each remote receiver. A differential correction from the calibration section 40 is applied to achieve a more accurate location if desired.

It should be understood that a variety of combinations of the above embodiments can be easily made. For example, a remote unit 10 may be configured to only operate when it is moved—therefore it includes only the motion detector 54. Movement initiates operation of the repeater 50 and radio system 20 for a short time period or alternatively, when movement stops.

What is claimed is:

1. A system for determining locations in a building comprising:

two or more pseudolites located proximate to the building, operable for receiving a global positioning satellite system signal, and operable for transmitting positioning signals within the building;

one or more remote receivers positionable within the building for receiving said positioning signals from a pseudolite;

a base station;

each remote receiver including a transmitter for communicating positioning data between said remote receiver and said base station; and the base station including a receiver for receiving positioning data from a remote receiver and a display for displaying the location of said remote receiver in said building.

2. The system of claim 1, the base station including a graphic display for graphically displaying the location of said remote receiver in said building.

3. A system for determining locations of objects in a building comprising:

one or more pseudolites located in or near the building which operate to transmit GPS positioning signals within the building;

one or more remote receivers accompanying said objects within the building for receiving the GPS positioning signals from the one or more pseudolites and each receiver operable for formulating positioning data indicative of receiver location within the building using said GPS positioning signals;

a base station having a receiver for receiving said positioning data from a remote receiver; and a display for indicating the location of the remote receiver in said building.

4. The system of claim 3, wherein said pseudolites transmit GPS signals within the building.

5. The system of claim 3, wherein said GPS signals comprise a pseudo random code.

6. The system of claim 3, wherein said pseudolites rebroadcast within said building a GPS signal received from a GPS satellite.

7. The system of claim 3, wherein said objects are freight containers and said building is a warehouse.

8. A method of determining locations within a building comprising the steps of:

providing one or more remote receivers which receive GPS signals within the building;

transmitting a GPS signal within the building;

receiving said GPS signals at said remote receiver and formulating positioning data indicative of receiver location within the building;

transmitting said positioning data from said receiver to a base station; and displaying the location within the building of the remote receiver using said positioning data.

9. The method of claim 8, wherein the positioning data is the location of the receiver within the building.

10. The method of claim 8, wherein the positioning data is a rebroadcast of at least a portion of the GPS signal from which the receiver location may be determined.

11. The method of claim 8, wherein said GPS signal transmitted within the building emanates from a pseudolite and comprises a pseudo random code.

12. The method of claim 8, wherein said GPS signals transmitted within the building comprise a spread spectrum signal.

13. The method of claim 8, wherein said GPS signals transmitted within the building comprise a pulsed signal.

14. The method of claim 8, including the steps of transmitting a positioning signal within the building, receiving the positioning signal at the remote receiver, and formulating said positioning data indicative of receiver location within the building using said positioning signal.

15. The method of claim 14, including generating said positioning signal using a pseudolite.

* * * * *